United States Patent
Suzuki et al.

(10) Patent No.: US 6,760,688 B2
(45) Date of Patent: Jul. 6, 2004

(54) APPLIANCE MAINTENANCE APPARATUS AND APPLIANCE REMOTE MAINTENANCE SYSTEM

(75) Inventors: Kazuya Suzuki, Kanagawa-ken (JP); Toshikazu Saito, Kanagawa-ken (JP); Kazuya Sakurai, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 107 days.

(21) Appl. No.: 09/893,185

(22) Filed: Jun. 27, 2001

(65) Prior Publication Data

US 2001/0056336 A1 Dec. 27, 2001

(30) Foreign Application Priority Data

Jun. 27, 2000 (JP) ........................................ 2000-193202

(51) Int. Cl.⁷ ................................................. G06F 9/00
(52) U.S. Cl. ........................ 702/188; 702/58; 702/160; 702/189
(58) Field of Search ............................. 702/57, 58, 106, 702/189, 26, 118, 122, 123, 181, 182, 183, 185–188, 196; 315/312, 318; 600/407; 358/400; 700/108; 362/234; 340/31, 35

(56) References Cited

U.S. PATENT DOCUMENTS

| | | | | |
|---|---|---|---|---|
| 5,629,869 A | * | 5/1997 | Johnson et al. | 364/551.01 |
| 6,016,038 A | * | 1/2000 | Mueller et al. | 315/291 |
| 6,459,919 B1 | * | 10/2002 | Lys et al. | 600/407 |
| 6,548,967 B1 | * | 4/2003 | Dowling et al. | 315/318 |
| 2002/0013635 A1 | * | 1/2002 | Gotou et al. | 700/108 |
| 2002/0022551 A1 | * | 2/2002 | Watterson et al. | 482/8 |

* cited by examiner

Primary Examiner—Marc S. Hoff
Assistant Examiner—Felix Suarez
(74) Attorney, Agent, or Firm—Pearne & Gordon LLP (57) ABSTRACT

An appliance maintenance apparatus for contactlessly detecting the operation states of appliances and operating the appliances in response to the operation states of the appliances, and an appliance remote maintenance system which comprises a plurality of appliance maintenance apparatuses, and a remote diagnosis control apparatus which is communicatable with the appliance maintenance apparatus through a public network to ensure the remote diagnosis control of the appliance maintenance apparatus from a remote place.

10 Claims, 8 Drawing Sheets

APPLIANCE MAINTENANCE APPARATUS AND APPLIANCE REMOTE MAINTENANCE SYSTEM

BACKGROUND OF THE INVENTION

1. Field of the Invention

The present invention relates to an appliance maintenance apparatus and an appliance remote maintenance system, and more particularly to an appliance maintenance apparatus which can contactlessly detect the operation states of appliances, and can operate the appliances in response to the operation states of the appliances, and to an appliance remote maintenance system which comprises an appliance maintenance apparatus, and a remote diagnosis control apparatus which is communicatable with the appliance maintenance apparatus through a public network to ensure the remote diagnosis control of the appliance maintenance apparatus from a remote place.

2. Description of the Related Art

In recent years, many surveillance camera systems are used at such places as department stores, leisure centers and the like at which many people gather to watch the situations of these places. The surveillance camera system of this kind generally comprises a plurality of camera units for taking images in these places, and a display unit for displaying the images taken by the camera units. The display unit is in general located far away from the camera units.

The surveillance camera system of this type comprises a plurality of camera units arranged at many places, a plurality of display units smaller in number than the camera unit and provided in a surveillance room, a recording units for recording the images taken by the camera units, and a matrix switcher for selectively connecting and disconnecting the circuits between the camera units and the display units in compliance with the operator's instruction. The matrix switcher also may selectively connecting and disconnecting the circuit between the camera units and the recording units in compliance with the operator's instruction.

Figure 7:
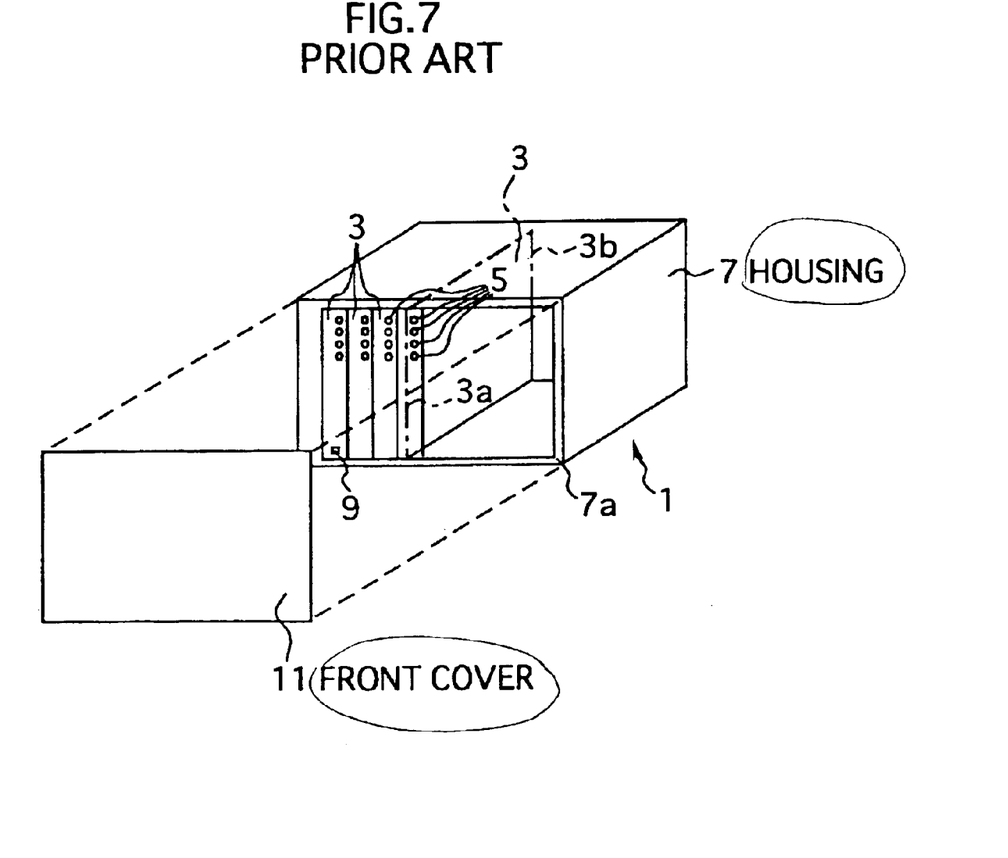
FIG. 7 is a perspective view of a conventional matrix switcher and a front cover forming part of the matrix switcher.

One of the conventional matrix switcher 1 is shown in FIG. 7 as comprising a plurality of base plates 3 each having a plurality of input and output terminals respectively connected with the camera units, the display unit and other appliances. Each of the base plates 3 has one side surface 3a on which are provided a plurality of LED light indicators 5 showing the operation states of the camera units, the display unit and other appliances and other side surface 3b having input and output terminals, not shown, thereon. The matrix switcher 1 further comprises a housing 7 formed with an opening 7a and accommodating therein the base plates 3 with the LED light indicators 5 aligned with one another on the opening 7a. The opening 7a of the housing 7 is covered by a front cover 11.

Figure 8:
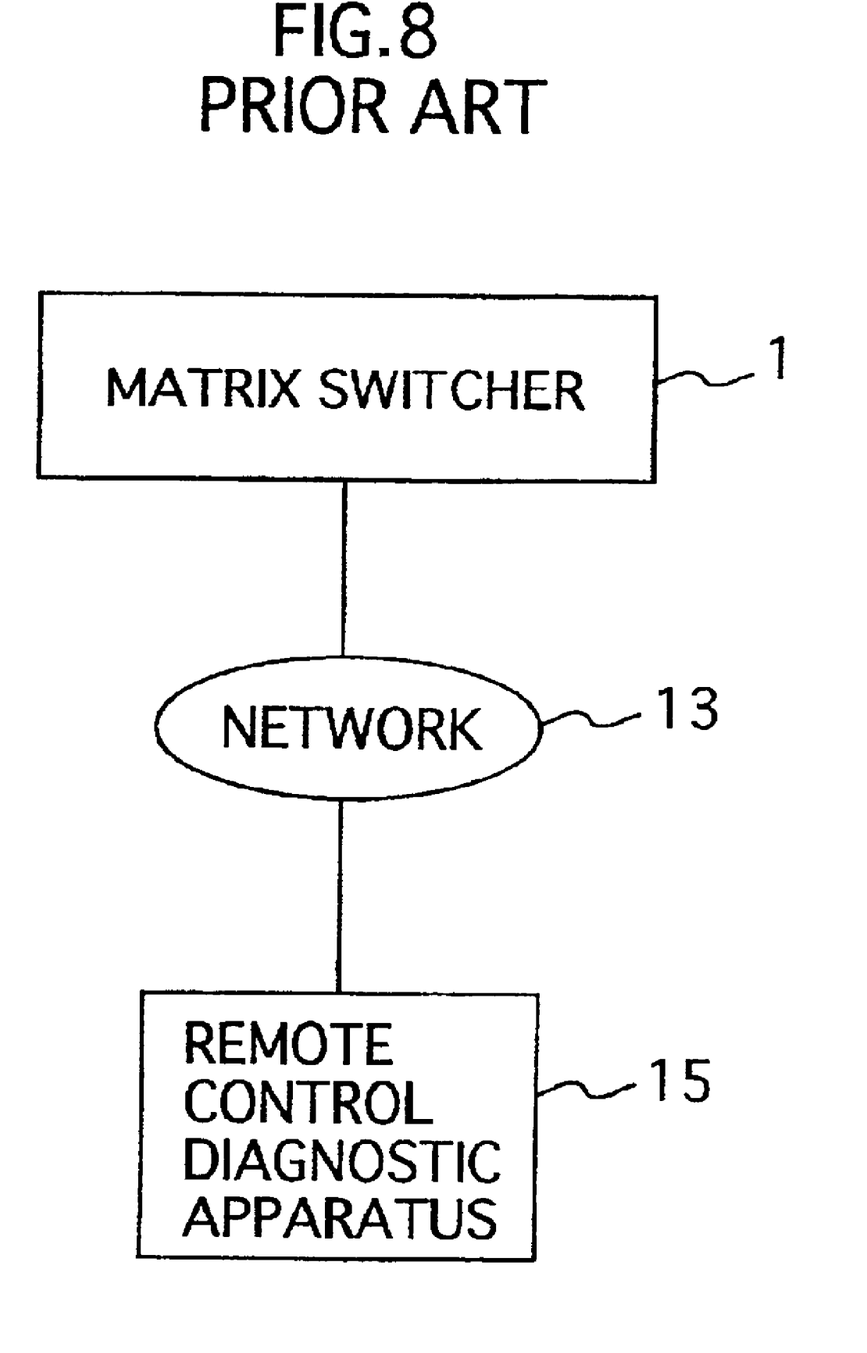
FIG. 8 is a block diagram of the matrix switcher in association with a remote diagnosis control apparatus connected to said matrix switcher through a public network.

The conventional matrix switcher 1 is controlled by a remote diagnosis control apparatus 15 which is installed far away from the matrix switcher 1 and thus is communicated with the matrix switcher 1 through a public network 13 to check the operation states of the matrix switcher 1 as shown in FIG. 8.

SUMMARY OF THE INVENTION

The conventional surveillance camera system encounters such a problems that the LED light indicators 5 cannot be watched from outside the housing 7 through the front cover 11, thereby forcing an operator to remove the front cover 11 from the housing 7 to confirm the state of the LED light indicators 5.

The conventional surveillance camera system is usually provided with a remote diagnosis function to diagnose the camera units from the remote place through the public network, however, cannot function to control the camera units through the public network if the controller forming part of the surveillance camera system comes to be out of order. If the operator wishes to maintain the controller out of order, the operator is required to confirm the states of the LED light indicators and to communicate by telephone with operators in charge of maintaining the surveillance camera system. The operator's task for this procedure is liable to be laborious and needs much time to be consumed.

It is therefore an object of the present invention to provide an appliance maintenance apparatus which can contactlessly detect the operation states of appliances, and can operate the appliances in response to the operation states of the appliances.

It is another object of the present invention to provide an appliance remote maintenance system which comprises an appliance maintenance apparatus, and a remote diagnosis control apparatus which is communicatable with the appliance maintenance apparatus through a public network to ensure the remote diagnosis control of the appliance maintenance apparatus from a remote place.

It is a further object of the present invention to provide an appliance maintenance apparatus and an appliance remote maintenance system which require the operator not to be dispatched to the site where the appliances out of order are installed but can specify the appliances out of order and ignore the damaged appliances from the other normal appliances, thereby enabling the operator to report the failure of the appliances to his or her users as well as making it possible to drastically reduce the cost for the maintenances of these appliances.

In accordance with a first aspect of the present invention, there is provided n appliance maintenance apparatus for maintaining a plurality of appliances each including a plurality of light indicators respectively emitting lights showing the operation states of each of the appliances, comprising: light detecting means for detecting the lights emitted from the light indicators.

In the aforesaid appliance maintenance apparatus, the light detecting means may include a plurality of light receiving elements to be respectively positioned in face-to-face and spaced relationship with the light indicators of each of the appliances.

In the aforesaid appliance maintenance apparatus, the lights collectively form light information, and the appliances may have a common reset switch for resetting the operations of the appliances. The aforesaid appliance maintenance apparatus may further comprise judging means for judging whether to operate the reset switch after diagnosing the operation states of the appliances on the basis of the light information detected by the light detecting means, and reset switch operating means for operating the reset switch when the judging means judges to operate the reset switch.

In the aforesaid appliance maintenance apparatus, each of the appliances may include a base plate having one side surface on which the light indicators are provided. The aforesaid appliance maintenance apparatus may further comprise: a housing formed with an opening and accommodating a plurality of the base plates, the light indicators on the one side surface of the base plates being aligned with one another on the opening of the housing, and a front cover plate having an inner surface and positioned to cover the opening of the housing with the inner surface opposing the opening of the housing, the inner surface having a plurality of the light receiving elements provided thereon in face-to-face and spaced relationship with the light indicators.

In the aforesaid appliance maintenance apparatus, the reset switch may be provided on the one side surface of the base plate, and the reset switch operating means may be provided on the inner surface of the front cover plate in face-to-face and spaced relationship with the reset switch.

In the aforesaid appliance maintenance apparatus, the lights collectively form light information, each of the appliances may have a reset switch for resetting the operation of the appliance. The aforesaid appliance maintenance apparatus may further comprise judging means for judging whether to operate the reset switch after diagnosing the operation states of the appliance on the basis of the light information detected by the light detecting means, and reset switch operating means for operating the reset switch when the judging means judges to operate the reset switch.

In the aforesaid appliance maintenance apparatus, each of the appliances may include a base plate having one side surface on which the light indicators are provided. The aforesaid appliance maintenance apparatus may further comprises: a housing formed with an opening and accommodating a plurality of the base plates, the light indicators on the one side surface of the base plates being aligned with one another on the opening of the housing, and a front cover plate having an inner surface and positioned to cover the opening of the housing with the inner surface opposing the opening of the housing, the inner surface having a plurality of the light receiving elements provided thereon in face-to-face and spaced relationship with the light indicators.

In the aforesaid appliance maintenance apparatus, the reset switches may be provided on the one side surface of the base plate, and the reset switch operating means may be provided on the inner surface of the front cover plate in face-to-face and spaced relationship with the reset switches.

In accordance with a second aspect of the present invention, there is provided an appliance maintenance apparatus for maintaining a appliance including a plurality of light indicators emitting lights showing the operation states of the appliance, comprising: light detecting means for detecting the lights emitted from the light indicators.

In the aforesaid appliance maintenance apparatus, the light detecting means may include a plurality of receiving elements to be respectively positioned in face-to-face and spaced relationship with the light indicators of the appliance.

In the aforesaid appliance maintenance apparatus, the lights collectively form light information, and the appliance has a reset switch for resetting the operation of the appliance. The aforesaid appliance maintenance apparatus may further comprise judging means for judging whether to operate the reset switch after diagnosing the operation states of the appliance on the basis of the light information detected by the light detecting means, and reset switch operating means for operating the reset switch when the judging means judges to operate the reset switch.

In the aforesaid appliance maintenance apparatus, the appliance may include a base plate having one side surface on which the light indicators are provided. The aforesaid appliance maintenance apparatus may further comprise: a housing formed with an opening and accommodating the base plate, the light indicators on the one side surface of the base plate on the opening of the housing, and a front cover plate having an inner surface and positioned to cover the opening of the housing with the inner surface opposing the opening of the housing, the inner surface having a plurality of the light receiving elements provided thereon in face-to-face and spaced relationship with the light indicator.

In the aforesaid appliance maintenance apparatus, the reset switch may be provided on the one side surface of the base plate, and the reset switch operating means may be provided on the inner surface of the front cover plate in face-to-face and spaced relationship with the reset switch.

In the aforesaid appliance maintenance apparatus, the lights collectively form light information. The aforesaid appliance maintenance apparatus may further comprise light information indicating means for indicating the light information detected by the light detecting means.

In the aforesaid appliance maintenance apparatus, the lights collectively form light information. The aforesaid appliance maintenance apparatus may further comprise light information storage means for storing light information detected by the light detecting means.

The aforesaid appliance maintenance apparatus may further comprise a remote diagnosis control unit for remotely diagnosing the one or more appliances, a communication unit for communicating with the remote diagnosis control unit, and a public network operatively connected to the remote diagnosis control unit and the communication unit to ensure communication between the remote diagnosis control unit and the communication unit.

In accordance with a third aspect of the present invention, there is provided an appliance remote maintenance system for maintaining a plurality of appliances from a remote location, each of the appliances including a plurality of light indicators respectively emitting lights showing the operation states of each of the appliances, comprising: an appliance maintenance apparatus including light detecting means for detecting the lights emitted from the light indicators, the lights collectively form light information, and information transmitting means for transmitting the light information detected by the light detecting means through a public network, and a remote diagnosis control apparatus including information receiving means for receiving the information transmitted from the information transmitting means through the public network to ensure the remote diagnosis controls of the appliances.

In the aforesaid appliance remote maintenance system, the light detecting means may include a plurality of light receiving elements to be respectively positioned in face-to-face and spaced relationship with the light indicators of each of the appliances.

In the aforesaid appliance remote maintenance system, the appliances may have a common reset switch for resetting the operations of the appliances. And in the aforesaid appliance remote maintenance system, the remote diagnosis control apparatus may further comprise judging means for judging whether to operate the reset switch after diagnosing the operation states of the appliances on the basis of the light information detected by the light detecting means, and instruction transmitting means for transmitting through the public network to the appliance maintenance apparatus an instruction to operate the reset switch when the judging means judges to operate the reset switch. In the aforesaid appliance remote maintenance system, the appliance maintenance apparatus may further comprise instruction receiving means for receiving the instruction transmitted from the instruction transmitting means through the public network, and reset switch operating means for operating the reset switch in compliance with the instruction transmitted from the instruction transmitting means and received by the instruction receiving means.

In the aforesaid appliance remote maintenance system, each of the appliances may include a base plate having one side surface on which the light indicators are provided. The aforesaid appliance remote maintenance system may further comprise: a housing formed with an opening and accommodating a plurality of the base plates, the light indicators on the one side surface of the base plates being aligned with one another on the opening of the housing, and a front cover plate having an inner surface and positioned to cover the opening of the housing with the inner surface opposing the opening of the housing, the inner surface having a plurality of the light receiving elements provided thereon in face-to-face and spaced relationship with the light indicators.

In the aforesaid appliance remote maintenance system, the reset switch may be provided on the one side surface of the base plate, and the reset switch operating means may be provided on the inner surface of the front cover plate in face-to-face and spaced relationship with the reset switch.

In the aforesaid appliance remote maintenance system, each of the appliances may have a reset switch for resetting the operation of the appliance, and the remote diagnosis control apparatus may further comprise judging means for judging whether to operate the reset switch after diagnosing the operation states of the appliance on the basis of the light information detected by the light detecting means, and instruction transmitting means for transmitting through the public network to the appliance maintenance apparatus an instruction to operate the reset switch when the judging means judges to operate the reset switch. The appliance maintenance apparatus may further comprise instruction receiving means for receiving the instruction transmitted from the instruction transmitting means through the public network, and reset switch operating means for operating the reset switch in compliance with the instruction transmitted from the instruction transmitting means and received by the instruction receiving means.

In the aforesaid appliance remote maintenance system, each of the appliances may include a base plate having one side surface on which the light indicators are provided. The aforesaid appliance remote maintenance system may further comprise: a housing formed with an opening and accommodating a plurality of the base plates, the light indicators on the one side surface of the base plates being aligned with one another on the opening of the housing, and a front cover plate having an inner surface and positioned to cover the opening of the housing with the inner surface opposing the opening of the housing, the inner surface having a plurality of the light receiving elements provided thereon in face-to-face and spaced relationship with the light indicators.

In the aforesaid appliance remote maintenance system, the reset switches may be provided on the one side surface of the base plate, and the reset switch operating means may be provided on the inner surface of the front cover plate in face-to-face and spaced relationship with the reset switches.

In accordance with a fourth aspect of the present invention, there is provided an appliance remote maintenance system for maintaining a appliance from a remote location, the appliance including a plurality of light indicators emitting lights showing the operation states of the appliance, comprising: an appliance maintenance apparatus including light detecting means for detecting the lights emitted from the light indicators, the lights collectively form light information, and information transmitting means for transmitting the light information detected by the light detecting means through a public network, and a remote diagnosis control apparatus including information receiving means for receiving the information transmitted from the information transmitting means through the public network to ensure the remote diagnosis control of the appliance.

In the aforesaid appliance remote maintenance system, the light detecting means may include a plurality of light receiving elements to be respectively positioned in face-to-face and spaced relationship with the light indicators of the appliance.

In the aforesaid appliance remote maintenance system, the appliance may have a reset switch for resetting the operation of the appliance, and the remote diagnosis control apparatus may further comprise judging means for judging whether to operate the reset switch after diagnosing the operation states of the appliance on the basis of the light information detected by the light detecting means, and instruction transmitting means for transmitting through the public network to the appliance maintenance apparatus an instruction to operate the reset switch when the judging means judges to operate the reset switch, the appliance maintenance apparatus further comprises instruction receiving means for receiving the instruction transmitted from the instruction transmitting means through the public network, and reset switch operating means for operating the reset switch in compliance with the instruction transmitted from the instruction transmitting means and received by the instruction receiving means.

In the aforesaid appliance remote maintenance system, the appliance may include a base plate having one side surface on which the light indicators are provided. The aforesaid appliance remote maintenance system may further comprises: a housing formed with an opening and accommodating the base plate, the light indicators on the one side surface of the base plate on the opening of the housing, and a front cover plate having an inner surface and positioned to cover the opening of the housing with the inner surface opposing the opening of the housing, the inner surface having a plurality of the light receiving elements provided thereon in face-to-face and spaced relationship with the light indicators.

In the aforesaid appliance remote maintenance system, the reset switch may be provided on the one side surface of the base plate, and the reset switch operating means may be provided on the inner surface of the front cover plate in face-to-face and spaced relationship with the reset switch.

The aforesaid appliance remote maintenance system may further comprise light information indicating means for indicating light information detected by the light detecting means of the appliance maintenance apparatus.

The aforesaid appliance remote maintenance system may further comprise light information storage means for storing light information detected by the light detecting means of the appliance maintenance apparatus.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENT

Figures 1A, 1B, 1C:
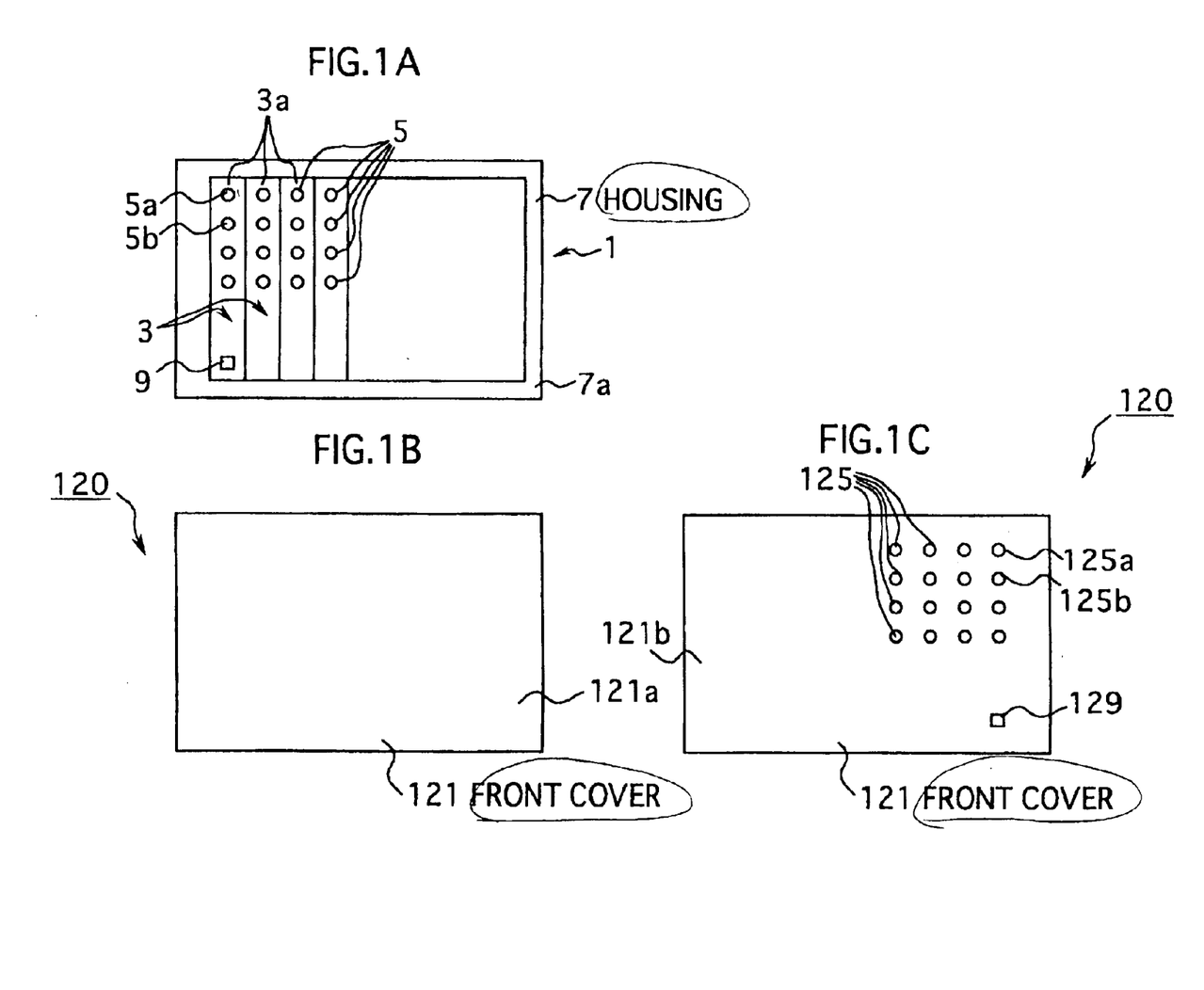
FIG. 1A is a front view of a switcher 1 connected with target appliances to be maintained.
FIG. 1B is a front view of a front cover 121 forming part of a first preferred embodiment of the appliance maintenance apparatus 120 according to the present invention.
FIG. 1C is a rear view of the front cover 121 forming part of the appliance maintenance apparatus 120 according to the present invention.

Referring now to the drawings, in particular, to FIGS. 1A, 1B, 1C and 7, there is shown a first preferred embodiment of the appliance maintenance apparatus 120 according to the present invention. FIG. 1A shows a matrix switcher 1 similar in construction and operation to the conventional matrix switcher 1. The similar constitutional elements and parts are simply represented by the same reference numerals and thus omitted from description for avoiding tedious repetition. Here, the matrix switcher 1 is assumed to be connected with a plurality of appliances to be maintained by the appliance maintenance apparatus 120 according to the present invention. The matrix switcher 1 comprises a plurality of base plates 3 each having a plurality of input and output terminals respectively connected with the appliances such as camera units, display units and other appliances. Each of the base plates 3 has one side surface 3a on which are provided a plurality of LED light indicators 5 showing the operation states of the appliances such as camera units, display unit and other appliances and other side surface 3b having input and output terminals thereon, not shown. The matrix switcher 1 further comprises a housing 7 formed with an opening 7a and accommodating therein the base plates 3 with the LED light indicators 5 aligned with one another on the opening 7a. The first embodiment of the appliance maintenance apparatus 120 according to the present invention is constituted partly by a front cover 121 which is attached to the housing 7 by a suitable fastening means, not shown, with the opening 7a of the housing 7 being covered by a front cover 121. The front cover 121 has an inner surface, i.e., a front surface 121a, and a rear surface 121b to be disposed in face-to-face and spaced relationship with the opening 7a of the housing 7 when the front cover 121 which is attached to the housing 7 is closed. The rear surface 121b of the front cover 121 is provided with a plurality of light receiving elements 125 respectively arranged in face-to-face and space relationship with the LED light indicators 5 fixedly mounted on the base plate 3. More specifically, the LED light indicators 5a and 5b on the base plate 3 are arranged in face-to-face and spaced relationship with the light receiving elements 125a and 125b, respectively. This means that the LED light indicators 5a and 5b on the base plate 3 are in alignment with the light receiving elements 125a and 125b, respectively to ensure that the lights emitted from the LED light indicators 5a and 5b are received by the light receiving elements 125a and 125b, respectively.

As will be seen from the above description, the above light indicators 5 serve as respectively emitting lights showing the operation states of each of said appliances. The above light receiving elements 125 collectively constitute light detecting means for detecting the lights emitted from the light indicators 5.

The appliances have a common reset switch 9 mounted on one of the base plates 3 to reset the operations of the appliances connected with the base plates 3. The appliance maintenance apparatus 120 according to the present invention further comprises reset switch operating means 129 mounted on the front cover 121 to operate the reset switch 9. The reset switch operating means 129 is constituted by a plunger mounted on the front cover 121 in face-to-face and spaced relationship with the reset switch 9 and surrounded by a solenoid coil so that the reset switch 9 is pushed down by the plunger 129 when the plunger 129 is electrically operated with the solenoid coil energized.

Figure 2:
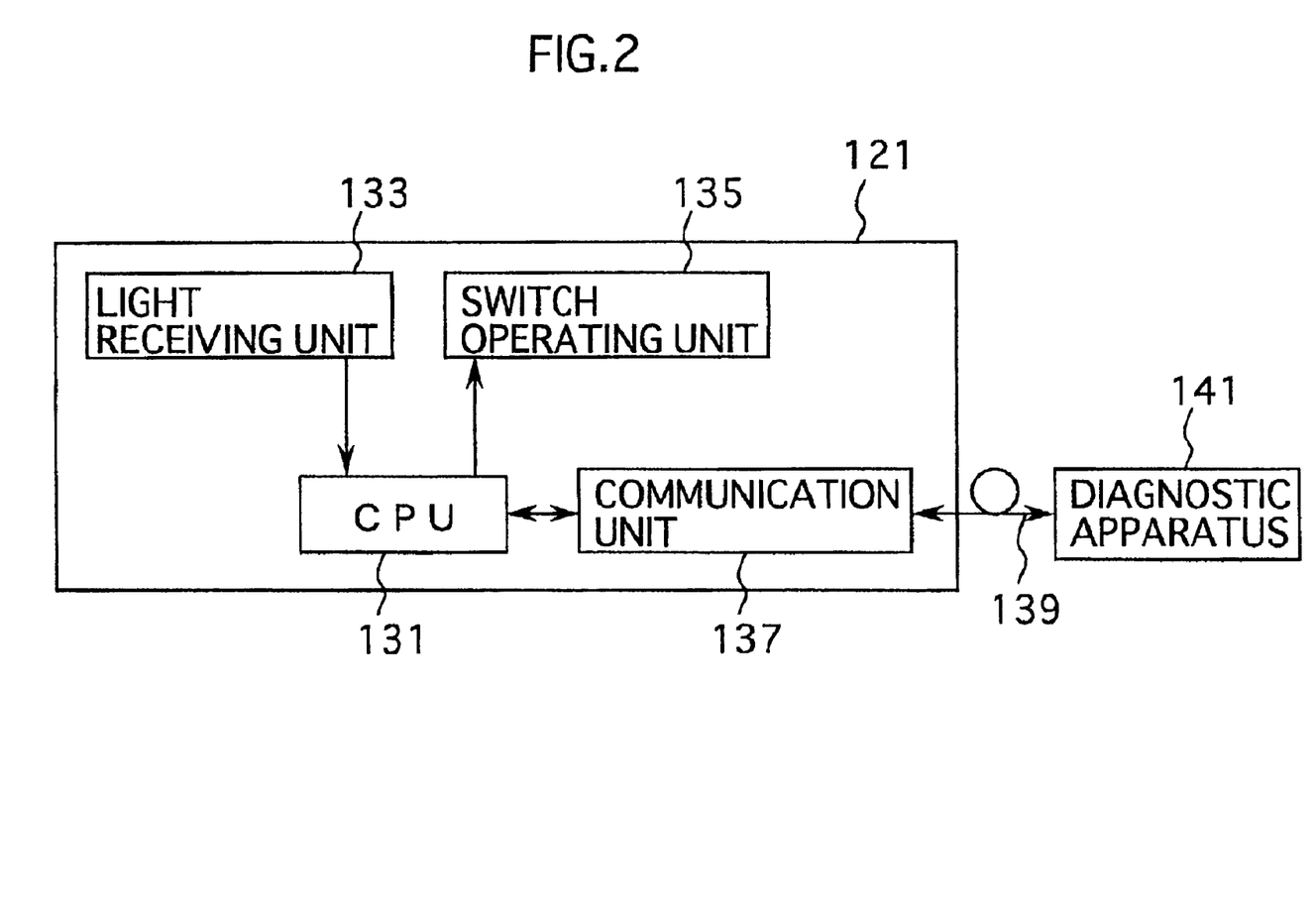
FIG. 2 is a block diagram of the appliance maintenance apparatus 120 according to the present invention shown in FIGS. 1A, 1B and 1C.

FIG. 2 shows a block diagram of the appliance maintenance apparatus 120 as shown in FIG. 1. The front cover 121 forming part of the appliance maintenance apparatus 120 is provided with a central processing unit, hereinafter referred to as "CPU" 131 for controlling the whole parts of the appliance maintenance apparatus 120, a light receiving unit 133 for receiving lights detected by the light receiving elements 125, a switch operation unit 135 for operating the plunger 129, and a communication unit 137 for controlling communication between the appliance maintenance apparatus 120 and other outside apparatuses located away from the appliance maintenance apparatus.

The appliance maintenance apparatus 120 according to the present invention is shown in FIG. 2 to comprise a front cover 121 and a diagnostic apparatus 141 electrically connected to the communication unit 137 through a communication cable 139. The light receiving unit 133 is electrically connected to the CPU 131 to receive the lights detected by the light receiving elements 125 before outputting the light information to the CPU.

More particularly, the lights detected by the light receiving elements 125 form light information. This means that the light receiving unit 133 is operative to receive light information detected by the light receiving elements 125 and output the light information thus received to the CPU 131.

The switch operation unit 135 is electrically connected to the CPU to operate the plunger 129 in response to the instruction from the CPU 131 before pushing down the reset operation switch 9.

The communication unit 137 is designed to transmit the light information detected by the light receiving unit 133 to the diagnostic apparatus 141 and to receive the instruction to operate the reset operation switch of the appliance from the diagnostic apparatus 141. The diagnostic apparatus 141 constitutes the judging means according to the present invention.

The communication cable 139 is made of a serial cable. Alternatively, the communication between the appliance maintenance apparatus 120 and the diagnostic unit 144 may be carried out wirelessly, in place of the communication cable 139.

The diagnostic apparatus 141 is adapted to receive the light information detected by the light receiving unit 133 from the communication unit 137 through the communication cable 139, diagnose the operation states of the appliances connected with the base plates 3 on the basis of the light information detected by the light receiving unit 133 and judge whether to operate the reset switch 9 or not. Furthermore, the diagnostic apparatus 141 is adapted to send an instruction to the switch operating means 129 to operate the reset switch 9 when it is judged that the reset switch 9 is to be operated.

The appliance maintenance apparatus 120 thus constructed can contactlessly diagnose the operation states of the appliances connected with the base plates on the basis of the light information emitted from the LED light indicators 5 without receiving any influence from those appliances. The appliance maintenance apparatus 102 can operate the reset switch 9 depending on the diagnostic results.

In the case of the conventional matrix switcher 1, the operator must remove the front cover 11 to observe the LED light indicators 5. While, on the other hand, the first embodiment of the appliance maintenance apparatus 120 according to the present invention makes it possible for the operator to observe and diagnose the operation states of the appliances and reset the operations of the appliances without removing the front cover 121.

As will be seen from the foregoing description, the first embodiment of the appliance maintenance apparatus 120 according to the present invention can contactlessly diagnose the operation states of the appliances connected with the base plates 3 only by replacing the front cover 11 of the conventional matrix switcher 1 with the front cover 121 of the appliance maintenance apparatus 120.

The diagnostic apparatus 141 may be provided with a display section, not shown, for indicating the light information detected by the light receiving elements 125. The appliance maintenance apparatus 120 thus constructed permits the operator to contactlessly and visually observe the operation states of the appliances.

The diagnostic apparatus 141 may be provided with a storing unit for storing the light information detected by the light receiving element 125. The appliance maintenance apparatus 120 thus constructed can record the operation states of the appliances with respect to the elapsed time, thereby permitting the operator to observe the change of the operation states of the appliances with respect to the elapsed time.

Furthermore, the diagnostic apparatus 141 may be provided with various types of functions. Alternatively, the diagnostic apparatus 141 may be only designed to keep logs of the light information detected by the light receiving elements 125 and output the logs, for example, in the form of data or screen display.

In the appliance maintenance apparatus 120 according to the present invention, the light receiving elements 125 and the reset switch operating means 129 may not be mounted on the front cover 121 as far as the light receiving elements 125 and the reset switch operating means 129 can perform their functions.

Each of the appliances connected with the base plates 3 may have a reset switch for resetting the operation of the appliance. According to the present invention, the appliance maintenance apparatus may comprise reset switch operating means for operating a plurality of reset switches.

Figures 5A, 5B, 5C:
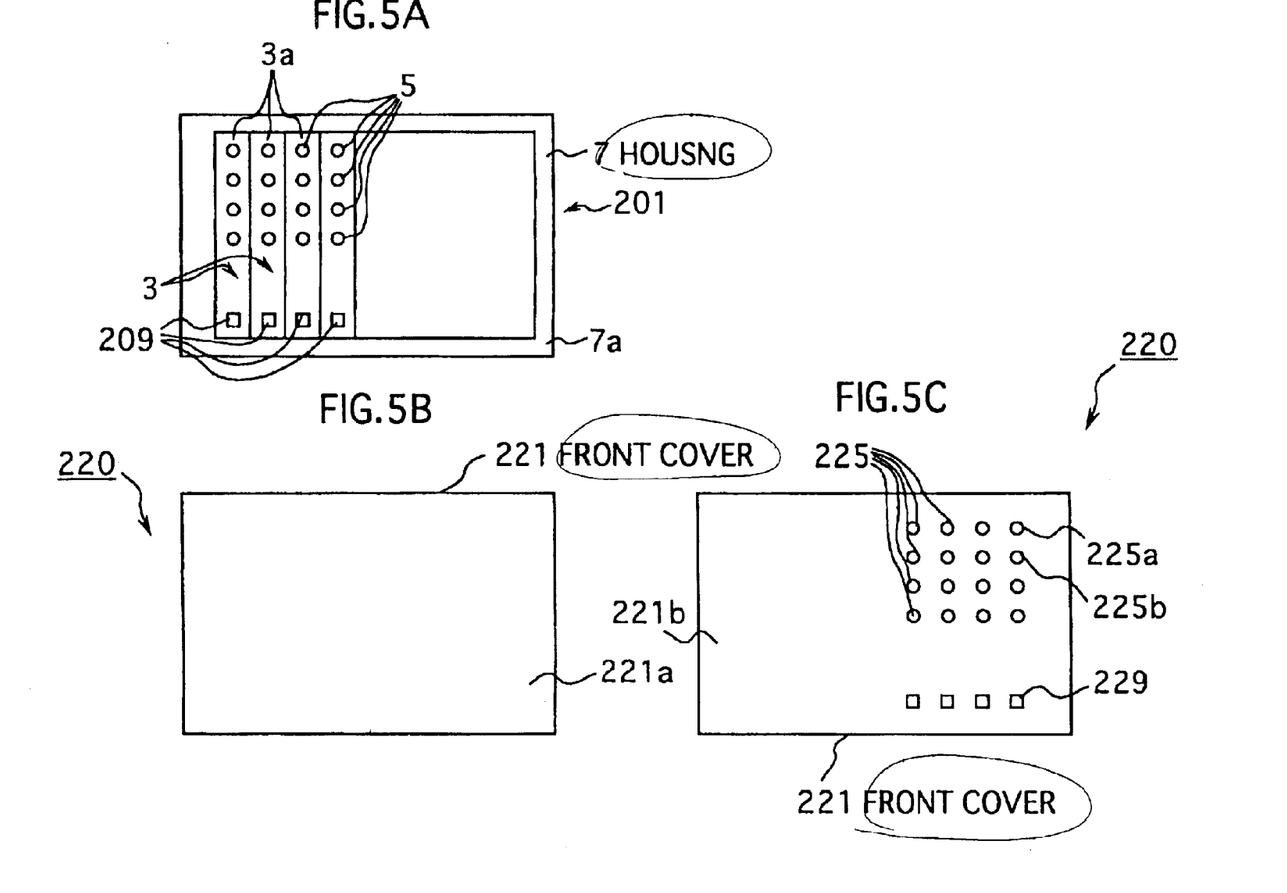
FIG. 5A is a front view of a switcher 201 connected with target appliances to be maintained.
FIG. 5B is a front view of a front cover 221 forming part of a second preferred embodiment of the appliance maintenance apparatus 220 according to the present invention.
FIG. 5C is a rear view of the front cover 221 forming part of the appliance maintenance apparatus 220 according to the present invention.

Referring next to the FIGS. 5A, 5B, 5C of the drawings, there is shown a second preferred embodiment of the appliance maintenance apparatus 220 according to the present invention. The description of the same construction and operation as the first embodiment of the appliance maintenance apparatus 120 will be omitted to avoid tedious repetition.

FIG. 5A shows a switcher 201 similar in construction and operation to the conventional matrix switcher 1. The similar constitutional elements and parts are simply represented by the same reference numerals and thus omitted from description for avoiding tedious repetition. Here, the matrix switcher 201 is assumed to be connected with a plurality of appliances to be maintained by the appliance maintenance apparatus 120 according to the present invention. The switcher 201 comprises a plurality of base plates 3 each having a plurality of input and output terminals respectively connected with the appliances such as camera units, display units and other appliances. Each of the base plates 3 has one side surface 3a on which are provided a plurality of LED light indicators 5 showing the operation states of the appliances such as camera units, display unit and other appliances and other side surface 3b having input and output terminals thereon, not shown. The switcher 201 further comprises a housing 7 formed with an opening 7a and accommodating therein the base plates 3 with the LED light indicators 5 aligned with one another on the opening 7a. The second embodiment of the appliance maintenance apparatus 220 according to the present invention is constituted partly by a front cover 221 which is attached to the housing 7 by a suitable fastening means, not shown, with the opening 7a of the housing 7 being covered by a front cover 221. The front cover 221 has a front surface 221a, and a rear surface 221b to be disposed in face-to-face and spaced relationship with the opening 7a of the housing 7 when the front cover 221 which is attached to the housing 7 is closed. The rear surface 221b of the front cover 221 is provided with a plurality of light receiving elements 225 respectively arranged in face-to-face and space relationship with the LED light indicators 5 fixedly mounted on the base plate 3. More specifically, the LED light indicators 5a and 5b on the base plate 3 are arranged in face-to-face and spaced relationship with the light receiving elements 225a and 225b, respectively. This means that the LED light indicators 5a and 5b on the base plate 3 are in alignment with the light receiving elements 225a and 225b, respectively to ensure that the lights emitted from the LED light indicators 5a and 5b are received by the light receiving elements 225a and 225b, respectively.

As will be seen from the above description, the above light indicators 5 serve as respectively emitting lights showing the operation states of each of said appliances. The above light receiving elements 225 collectively constitute light detecting means for detecting the lights emitted from the light indicators 5.

Each of the appliances has a reset switch 9 mounted on one of the base plates 3 to reset the operation of the appliance connected with the base plates 3. The appliance maintenance apparatus 220 according to the present invention further comprises reset switch operating means 229 mounted on the front cover 221 to operate the reset switch 9. The reset switch operating means 229 is constituted by a plurality of plungers mounted on the front cover 221 in face-to-face and spaced relationship with the reset switches 9 and surrounded by a solenoid coil so that the reset switch 9 is pushed down by the plunger 229 when the plunger 129 is electrically operated with the solenoid coil energized.

There may be only one base plate mounted on the switcher and only one appliance is connected with the base plate. According to the present invention, the appliance maintenance apparatus may maintain only one appliance.

Figure 6A:
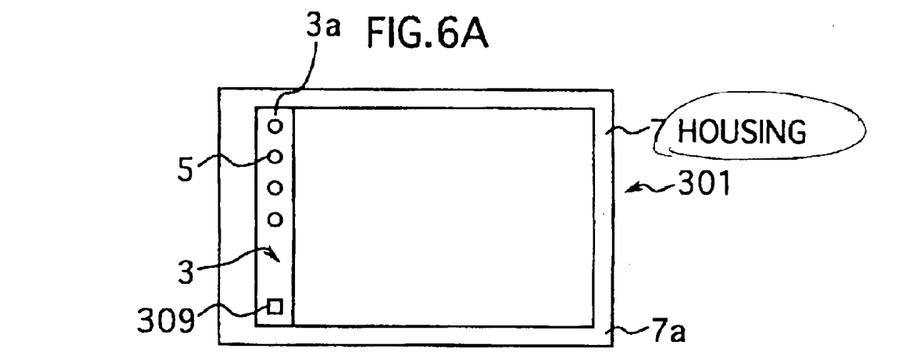
FIG. 6A is a front view of a switcher 301 connected with target appliances to be maintained.
Figure 6B:
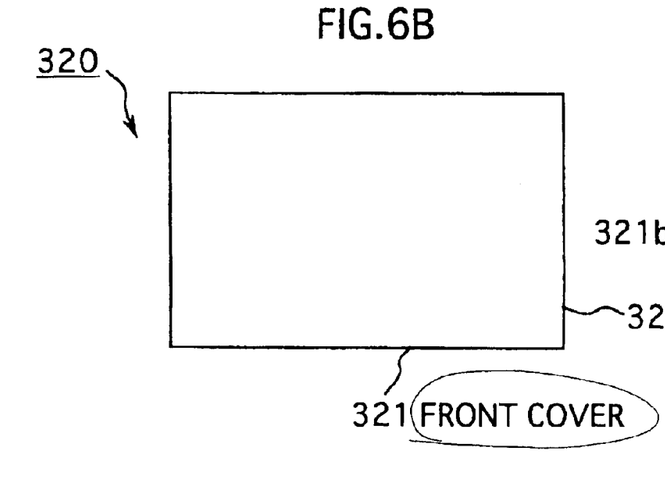
FIG. 6B is a front view of a front cover 321 forming part of a third preferred embodiment of the appliance maintenance apparatus 320 according to the present invention.
Figure 6C:
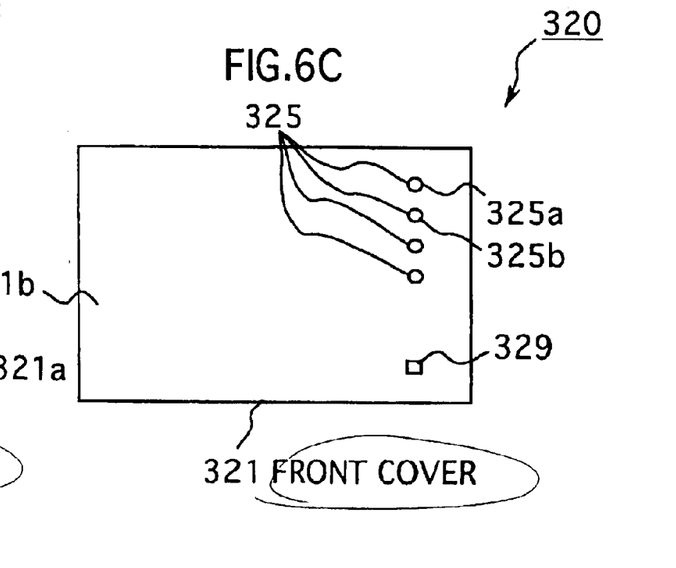
FIG. 6C is a rear view of the front cover 321 forming part of the appliance maintenance apparatus 320 according to the present invention.

Referring next to the FIGS. 6A, 6B, 6C of the drawings, there is shown a third preferred embodiment of the appliance maintenance apparatus 320 according to the present invention. The description of the same construction and operation as the first embodiment of the appliance maintenance apparatus 120 will be omitted to avoid tedious repetition.

FIG. 6A shows a switcher 301 similar in construction and operation to the conventional matrix switcher 1. The similar constitutional elements and parts are simply represented by the same reference numerals and thus omitted from description for avoiding tedious repetition. Here, the switcher 301 is assumed to be connected with one appliance to be maintained by the appliance maintenance apparatus 320 according to the present invention. The switcher 301 comprises one base plate 3 having a plurality of input and output terminals respectively connected with the appliance such as camera units, display units and other appliances. The base plate 3 has one side surface 3a on which are provided a plurality of LED light indicators 5 showing the operation states of the appliance such as camera units, display unit and other appliances and other side surface 3b having input and output terminals thereon, not shown. The switcher 301 further comprises a housing 7 formed with an opening 7a and accommodating therein the base plates 3 with the LED light indicators 5 aligned with one another on the opening 7a. The third embodiment of the appliance maintenance apparatus 320 according to the present invention is constituted partly by a front cover 321 which is attached to the housing 7 by a suitable fastening means, not shown, with the opening 7a of the housing 7 being covered by a front cover 321. The front cover 321 has a front surface 321a, and a rear surface 321b to be disposed in face-to-face and spaced relationship with the opening 7a of the housing 7 when the front cover 321 which is attached to the housing 7 is closed. The rear surface 321b of the front cover 321 is provided with a plurality of light receiving elements 325 respectively arranged in face-to-face and space relationship with the LED light indicators 5 fixedly mounted on the base plate 3. More specifically, the LED light indicators 5a and 5b on the base plate 3 are arranged in face-to-face and spaced relationship with the light receiving elements 325a and 325b, respectively. This means that the LED light indicators 5a and 5b on the base plate 3 are in alignment with the light receiving elements 325a and 325b, respectively to ensure that the lights emitted from the LED light indicators 5a and 5b are received by the light receiving elements 325a and 325b, respectively.

As will be seen from the above description, the above light indicators 5 serve as respectively emitting lights showing the operation states of each of said appliances. The above light receiving elements 325 collectively constitute light detecting means for detecting the lights emitted from the light indicators 5.

The appliances have a reset switch 9 mounted on one of the base plate 3 to reset the operations of the appliances connected with the base plates 3. The appliance maintenance apparatus 320 according to the present invention further comprises reset switch operating means 329 mounted on the front cover 321 to operate the reset switch 9. The reset switch operating means 329 is constituted by a plunger mounted on the front cover 121 in face-to-face and spaced relationship with the reset switch 9 and surrounded by a solenoid coil so that the reset switch 9 is pushed down by the plunger 329 when the plunger 329 is electrically operated with the solenoid coil energized.

Figure 3:
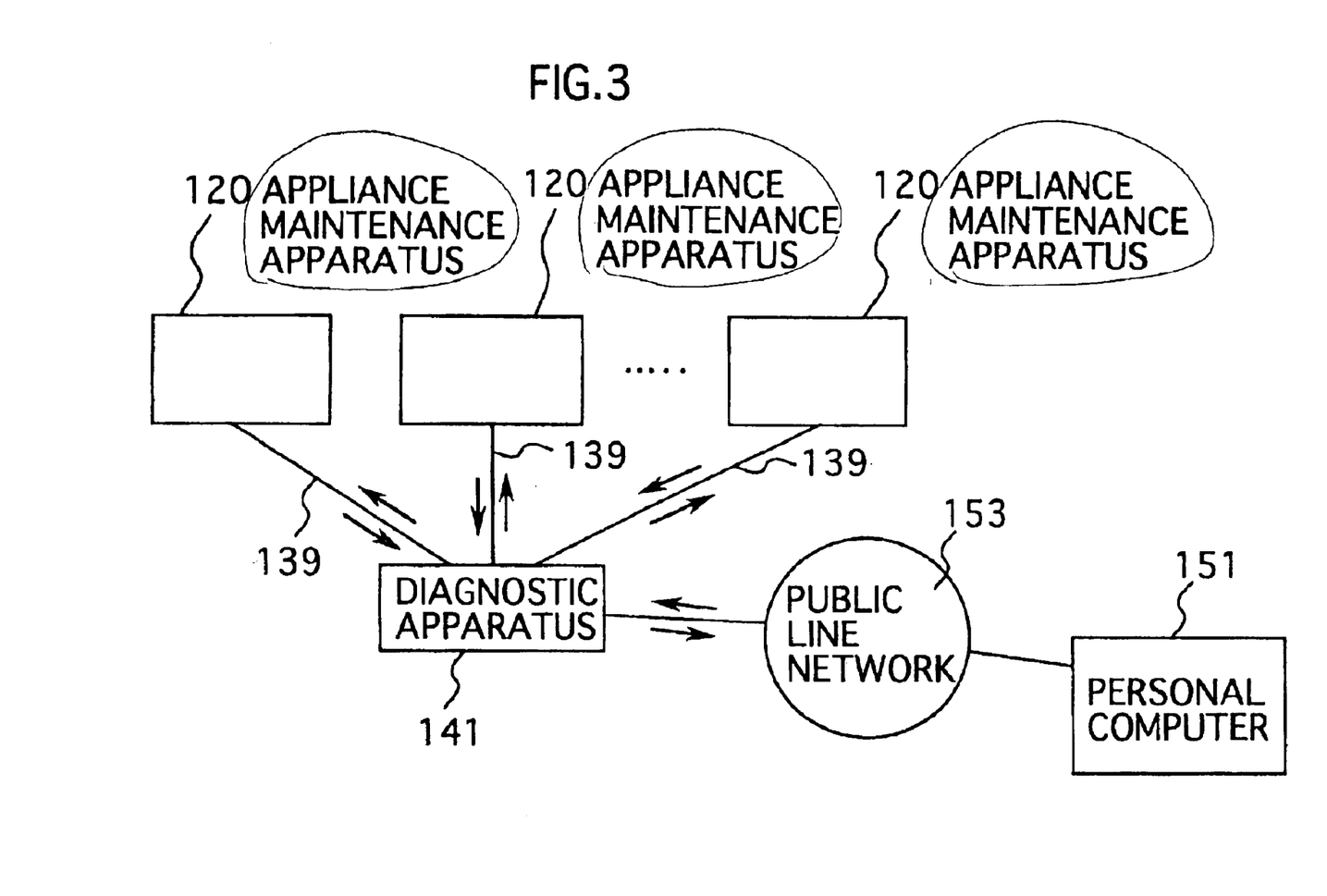
FIG. 3 is a block diagram of the appliance remote maintenance system according to the present invention.

Referring then to FIG. 3 of the drawings, there is shown a first preferred embodiment of an appliance remote maintenance system according to the present invention. The first embodiment of the appliance remote maintenance system according to the present invention comprises a plurality of appliance maintenance apparatuses including the appliance maintenance apparatuses 120, 220, and 320, one or more diagnostic apparatuses 141, a remote maintenance personal computer 151 and a public line network 153 for connecting the diagnostic apparatuses 141 and the remote maintenance personal computer 151. The appliance maintenance apparatuses 120, 220, and 320 are electrically connected to the diagnostic apparatuses 141 through a communications cable 139. The diagnostic apparatus 141 constitutes the remote diagnosis control apparatus according to the present invention.

The first embodiment of the appliance remote maintenance system is different from the first embodiment of the appliance maintenance apparatus 120 in that the diagnostic apparatuses 141 are adapted to diagnose a plurality of appliances on the basis of the light information received from the appliance maintenance apparatuses 120, 220, and 320 and the remote maintenance personal computer 151 is electrically connected to the diagnostic apparatuses 141 through the public line network 153.

The appliance maintenance apparatuses 120, 220, and 320 are almost the same in construction and operation. The appliance remote maintenance system according to the present invention will be therefore described with the appliance maintenance apparatus 120 raised as a representative example.

Figure 4:
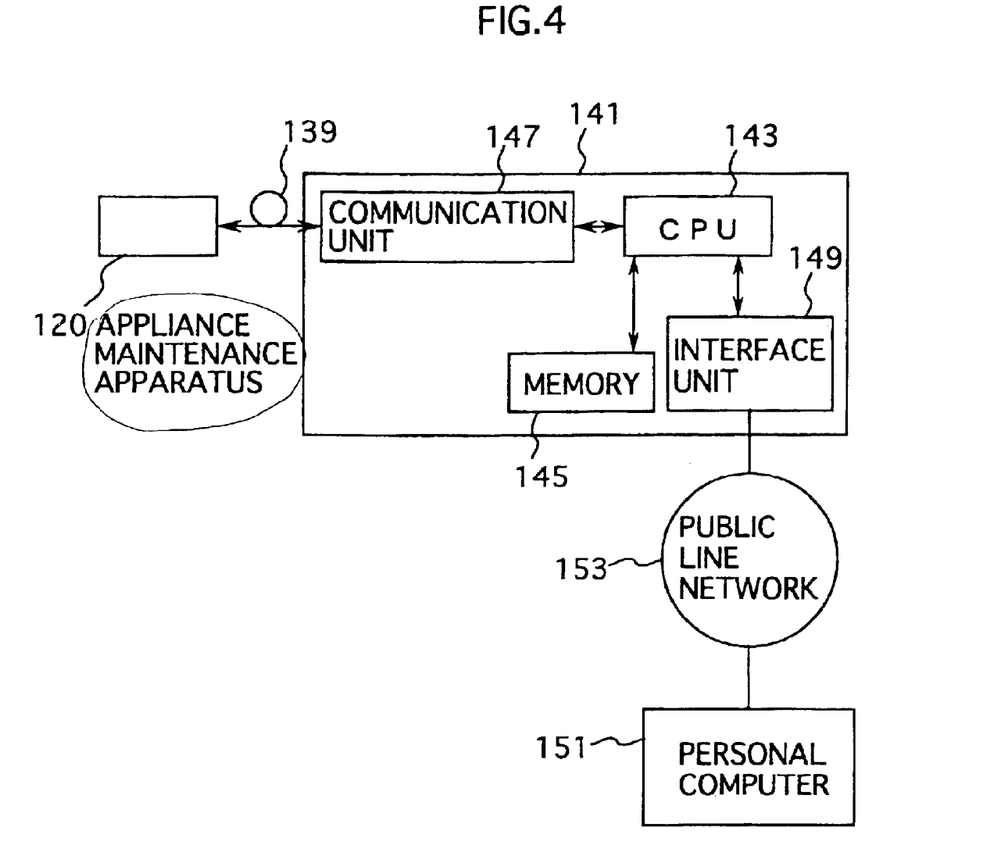
FIG. 4 is a block diagram of a remote diagnosis control apparatus forming part of the appliance remote maintenance system.

FIG. 4 is a block diagram showing the diagnostic apparatus 141 of the appliance remote maintenance system according to the present invention. The diagnostic apparatus 141 comprises a CPU 143 for controlling the whole parts of the diagnostic apparatus 141, a memory 145 for storing a various types of information, a communication unit 147 for controlling communication between the diagnostic apparatus 141 and the appliance maintenance apparatuses 120 through the communication cable 139, and an interface unit 149 for controlling communication between the diagnostic apparatus 141 and other outside apparatuses connected through the public line network 153.

The memory 145 is adapted to store information such as light information about the operation states of the appliances transmitted by the appliance maintenance apparatuses 120. The memory 145 enables to keep logs of the light information and the operation states of the appliances with respect to the elapsed time, thereby permitting the diagnostic apparatus 141 to record the change of the operation states of the appliances with respect to the elapsed time.

The public line network 153 includes, for instance, an analog communication line, and a digital communication line. A operator, for example, may dial up the diagnostic apparatus 141 from the remote maintenance personal computer 151 to retrieve the light information and operation states of the appliances stored in the memory 145 of the diagnostic apparatus 141. The public line network 153 enables the communications between the remote maintenance personal computer 151 and the diagnostic apparatuses 141 located all over the world.

The remote maintenance personal computer 151 comprises a CPU for controlling the whole parts of the remote maintenance personal computer 151, a storage section such as a magnetic disk storage for storing programs and data files, a cache memory for providing a working area of the CPU, a monitor for displaying various types of information screens, input means such as a key board and a mouse, a printer for printing data information, a speaker for outputting voice information, and a line interface connectable with the public line network 153. The line interface constitutes the information receiving means according to the present invention.

The remote maintenance personal computer 151 is adapted to receive the light information and operation states of the appliances from the diagnostic apparatus 141 through the public line network 153, store the thus stored light information and operation states of the appliances into the storage section, perform the programs such as a diagnostic program, analyze information obtained, and output the result, this means, for example, by displaying on the monitor screen, or printing it. The remote maintenance personal computer 151 includes, for instance, a commercially available personal computer, and a work station. The remote maintenance personal computer 151 may also sound a voice alarm, and output past log information.

The remote maintenance personal computer 151 may include a diagnostic program for automatically sending a reset instruction to the diagnostic apparatus 141 to reset the appliances or sending a reset instruction to the diagnostic apparatus 141 in compliance with the operator's decision after confirming the operation states of the appliances.

The operation of the first embodiment of the appliance remote maintenance system according to the present invention will be described hereinlater.

The appliances to be diagnosed and maintained are connected with the front cover 121 of the appliance maintenance apparatus 120 and the operation states of the appliances are shown by lights emitted collectively from the LED light indicators 5.

The lights emitted from the LED light indicators 5 form light information. The light receiving elements 125 of the front cover 121 of the appliance maintenance apparatus 120 is operated to detect the light information emitted from the LED light indicators 5 and output the light information to the CPU 131 through the light receiving unit 133. The CPU 131 is operated to send the light information emitted from the LED light indicators 5 to diagnostic apparatus 141 through the communication unit 137 and the communication cable 139.

The diagnostic apparatus 141 is operated to receive the light information from the communication unit 137 and store the received light information into the memory 145 through the CPU 143. The light information stored in the memory 145 of the diagnostic apparatus 141 will be transmitted to the remote maintenance personal computer 151 through the public line network 153 and the line interface.

The light information stored in the memory 145 may be transmitted to the remote maintenance personal computer 151 on demand, or at predetermined time interval. Alternatively, the remote maintenance personal computer 151 may directly received the light information emitted from the light LED light indicators 5 on demand to the appliance maintenance apparatus 120.

In the remote maintenance personal computer 151, the light information thus received is stored in the storage section, not shown, and analyzed in accordance with a analyzing software, and an analysis result is generated. The remote maintenance personal computer 151 is operated to output the analysis result, for instance, by a lamp indicator, not shown, or a monitor, not shown. The remote maintenance personal computer 151 may print out the analysis result or output voice information in accordance with the analysis result.

The operator can maintain the appliances in response to the analysis result thus outputted, and give a reset instruction if necessary. The reset instruction is transmitted to the diagnostic apparatus 141 from the remote maintenance personal computer 151 through the public line network 153. The diagnostic apparatus 141 is operated to receive the reset instruction and transmit the reset instruction thus received to the concerned appliance maintenance apparatus 120. The appliance maintenance apparatus 120 is operated to actuate the plunger 129 to push down the reset switch 9. The appliance remote maintenance system thus constructed enables the operator to reset the concerned appliances and restore the fault appliances without going to the site where the appliances are installed.

Alternatively, the reset instruction may be transmitted at predetermined time interval. The diagnostic apparatus 141 may include a diagnostic program for automatically diagnosing and resetting the appliances.

In the appliance remote maintenance system thus constructed, the appliance maintenance apparatus 120 can contactlessly detect the operation states of the appliances connected to the base plates 3 and transmit the information about the operation states of the appliances to the remote maintenance personal computer 151 installed away from the appliance maintenance apparatus 120 through the public line network 153. The appliances, the appliance maintenance apparatus 120, and the remote maintenance personal computer 151 are located separately, thereby enabling for the appliance maintenance apparatus 120 to transmit the operation states of the appliances to the remote maintenance personal computer 151 without receiving any influence from those appliances.

The appliance remote maintenance system thus constructed makes it possible for the operator to remotely diagnose the operation states of the appliances connected to the base plates 3 and push down the reset switch 9 of the appliances connected with the base plates 3 by operating the remote maintenance personal computer 151 in response to the diagnostic result.

The appliance remote maintenance system thus constructed can contactlessly diagnose the operation states of, and reset the appliances connected with the base plates 3 only by replacing the front cover 11 of the conventional matrix switcher 1 with the front cover 121 of the appliance maintenance apparatus 120 without removing the front cover 121 of the appliance maintenance apparatus 120. This means that the appliance remote maintenance system can remotely reset the appliances connected with the base plates 3 if necessary.

In the case of the conventional matrix switcher 1, the operator must remove the front cover 11 to observe the LED light indicators 5. While, on the other hand, the first embodiment of the appliance remote maintenance system according to the present invention makes it possible for the operator to observe and diagnose the operation states of the appliances and reset the operations of the appliances without removing the front cover 121.

As will be seen from the foregoing description, the first embodiment of the appliance remote maintenance system according to the present invention makes it possible for the operator to observe the operation states of the appliances connected with the base plates 3 by watching the display of the personal computer, output the operation states of the appliances as an alarm, confirm the logs of the operation states of the appliances connected with the base plates 3, thereby enabling to remotely diagnose, reboot, reset and maintain the appliances. This leads to the fact that the appliance remote maintenance system according to the present invention can omit any service person resident at the site where the appliances are installed or avoid dispatching any service person to the site where the appliances are installed for maintaining the appliances, thereby substantially reducing the maintenance cost.

What is claimed is:

1. An appliance maintenance apparatus for maintaining a plurality of appliances each including a plurality of light indicators respectively emitting lights showing the operation states of each of said appliances, comprising:

light detecting means for detecting said lights emitted from said light indicators, a remote diagnosis control unit for remotely diagnosing said one or more appliances, a communication unit for communicating with said remote diagnosis control unit, and a communication cable operatively connected to said remote diagnosis control unit and said communication unit to ensure communication between said remote diagnosis control unit and said communication unit.

2. An appliance remote maintenance system for maintaining a plurality of appliances from a remote location, each of said appliances including a plurality of light indicators respectively emitting lights showing the operation states of each of said appliances, comprising:

an appliance maintenance apparatus including light detecting means for detecting said lights emitted from said light indicators, said lights collectively form light information, and information transmitting means for transmitting said light information detected by said light detecting means through a public network, and a remote diagnosis control apparatus including information receiving means for receiving said information transmitted from said information transmitting means through said public network to ensure the remote diagnosis controls of said appliances;

wherein said appliances have a common reset switch for resetting the operations of said appliances, and said remote diagnosis control apparatus further comprises judging means for judging whether to operate said reset switch after diagnosing said operation states of said appliances on the basis of said light information detected by said light detecting means and instruction transmitting means for transmitting through said public network to said appliance maintenance apparatus an instruction to operate said reset switch when said judging means judges to operate said reset switch, said appliance maintenance apparatus further comprises instruction receiving means for receiving said instruction transmitted from said instruction transmitting means through said public network and reset switch operating means for operating said reset switch in compliance with said instruction transmitted from said instruction transmitting means and received by said instruction receiving means.

3. An appliance remote maintenance system as set forth in claim 2, in which each of said appliances includes a base plate having one side surface on which said light indicators are provided, and which further comprises:

a housing formed with an opening and accommodating a plurality of said base plates, said light indicators on said one side surface of the base plates being aligned with one another on said opening of said housing, and a front cover plate having an inner surface and positioned to cover said opening of said housing with said inner surface opposing said opening of said housing, said inner surface having a plurality of said light receiving elements provided thereon in face-to-face and spaced relationship with said light indicators.

4. An appliance remote maintenance system as set forth in claim 3, in which said reset switch is provided on said one side surface of said base plate, and said reset switch operating means is provided on said inner surface of said front cover plate in face-to-face and spaced relationship with said reset switch.

5. An appliance remote maintenance system for maintaining a plurality of appliances from a remote location, each of said appliances including a plurality of light indicators respectively emitting lights showing the operation states of each of said appliances, comprising:

an appliance maintenance apparatus including light detecting means for detecting said lights emitted from said light indicators, said lights collectively form light information, and information transmitting means for transmitting said light information detected by said light detecting means through a public network, and a remote diagnosis control apparatus including information receiving means for receiving said information transmitted from said information transmitting means through said public network to ensure the remote diagnosis controls of said appliances;

wherein each of said appliances has a reset switch for resetting the operation of said appliance, and in which said remote diagnosis control apparatus further comprises judging means for judging whether to operate said reset switch after diagnosing said operation states of said appliance on the basis of said light information detected by said light detecting means, and instruction transmitting means for transmitting through said public network to said appliance maintenance apparatus an instruction to operate said reset switch when said judging means judges to operate said reset switch, said appliance maintenance apparatus further comprises instruction receiving means for receiving said instruction transmitted from said instruction transmitting means through said public network, and reset switch operating means for operating said reset switch in compliance with said instruction transmitted from said instruction transmitting means and received by said instruction receiving means.

6. An appliance remote maintenance system as set forth in claim 5, in which each of said appliances includes a base plate having one side surface on which said light indicators are provided, and which further comprises:

a housing formed with an opening and accommodating a plurality of said base plates, said light indicators on said one side surface of the base plates being aligned with one another on said opening of said housing, and a front cover plate having an inner surface and positioned to cover said opening of said housing with said inner surface opposing said opening of said housing, said inner surface having a plurality of said light receiving elements provided thereon in face-to-face and spaced relationship with said light indicators.

7. An appliance remote maintenance system as set forth in claim 6, in which said reset switches are provided on said one side surface of said base plate, and said reset switch operating means is provided on said inner surface of said front cover plate in face-to-face and spaced relationship with said light indicators.

8. An appliance remote maintenance system for maintaining an appliance from a remote location, said appliance including a plurality of light indicators emitting lights showing the operation states of said appliance, comprising:

an appliance maintenance apparatus including light detecting means for detecting said lights emitted from said light indicators, said lights collectively form light information, and information transmitting means for transmitting said light information detected by said light detecting means through a public network, and a remote diagnosis control apparatus including information receiving means for receiving said information transmitted from said information transmitting means through said public network to ensure the remote diagnosis control of said appliance, said appliance has a reset switch for resetting the operation of said appliance, and in which said remote diagnosis control apparatus further comprises judging means for judging whether to operate said reset switch after diagnosing said operation states of said appliance on the basis of said light information detected by said light detecting means, and instruction transmitting means for transmitting through said public network to said appliance maintenance apparatus an instruction to operate said reset switch when said judging means judges to operate said reset switch, said appliance maintenance apparatus further comprises instruction receiving means for receiving said instruction transmitted from said instruction transmitting means through said public network, and reset switch operating means for operating said reset switch in compliance with said instruction transmitted from said instruction transmitting means and received by said instruction receiving means.

9. An appliance remote maintenance system as set forth in claim 8, in which said appliance includes a base plate having one side surface on which said light indicators are provided, and which further comprises:

a housing formed with an opening and accommodating said base plate, said light indicators on said one side surface of the base plate on said opening of said housing, and a front cover plate having an inner surface and positioned to cover said opening of said housing with said inner surface opposing said opening of said housing, said inner surface having a plurality of said light receiving elements provided thereon in face-to-face and spaced relationship with said light indicators.

10. An appliance remote maintenance system as set forth in claim 9 in which said reset switch is provided on said one side surface of said base plate, and said reset switch operating means is provided on said inner surface of said front cover plate in face-to-face and spaced relationship with said reset switch.

\* \* \* \* \*